(12) United States Patent
Feng

(10) Patent No.: US 6,467,986 B2
(45) Date of Patent: Oct. 22, 2002

(54) BENDING MECHANISM OF ROD

(75) Inventor: Pin-Chieh Feng, Chnag Hua Hsien (TW)

(73) Assignee: Melton International L.L.C., Dover, DE (US)

(*) Notice: Subject to any disclaimer, the term of this patent is extended or adjusted under 35 U.S.C. 154(b) by 87 days.

(21) Appl. No.: 09/765,401

(22) Filed: Jan. 22, 2001

(65) Prior Publication Data

US 2002/0064417 A1 May 30, 2002

(30) Foreign Application Priority Data

Nov. 29, 2000 (TW) ...................................... 89220833 U

(51) Int. Cl.⁷ .............................................. F16C 11/00
(52) U.S. Cl. ............................. 403/93; 403/84; 403/94; 280/87.041
(58) Field of Search ............................. 403/119, 83, 84, 403/93, 94, 102, 103, 150, 154, 155, 151; 248/284.1, 291.1; 280/87.041

(56) References Cited

U.S. PATENT DOCUMENTS

| | | | | |
|---|---|---|---|---|
| 5,026,198 A | * | 6/1991 | Lin ........................... | 403/93 X |
| 5,265,969 A | * | 11/1993 | Chuang ....................... | 403/94 |
| 5,620,272 A | * | 4/1997 | Sheng ....................... | 403/84 X |
| 6,364,562 B1 | * | 4/2002 | Tung .......................... | 403/93 |

* cited by examiner

Primary Examiner—Lynne H. Browne
Assistant Examiner—John R. Cottingham
(74) Attorney, Agent, or Firm—Browdy and Neimark, PLLC

(57) ABSTRACT

A rod bending mechanism is disposed between a first segment and a second segment of the rod and is formed of a pivoting plate extending from one end of the first segment, a pivoting seat having two side plates extending from one end of the second segment, and at least one locating member disposed on one of the two side plates. The pivoting plate is pivoted with the pivoting seat such that the pivoting plate and the pivoting seat are located by the locating member.

6 Claims, 9 Drawing Sheets

BENDING MECHANISM OF ROD

FIELD OF THE INVENTION

The present invention relates generally to a bending mechanism, and more particularly to a rod bending mechanism.

BACKGROUND OF THE INVENTION

As shown in FIGS. 1 and 2, a rod bending mechanism of the prior art involves a rod 1, which is divided into a lower segment 2 and an upper segment 6. The lower segment 2 is provided with an insertion plate 3 extending therefrom. The insertion plate 3 is provided with a pivoting hole 4 and two locating holes 5. The upper segment 6 is provided with a pivoting seat 7 extending therefrom. The pivoting seat 7 is provided at the center with an insertion slot 8 for receiving the insertion plate 3 such that the pivoting seat 7 is pivoted with the insertion plate 3 by a spindle 9 which is put through the pivoting hole 4. The pivoting seat 7 is provided with a through hole 10 and a receiving hole 11. The through hole 10 is provided therein with a press rod 13 which is fitted into a spring 12 and is fastened with a retaining member 14. The retaining member 14 has an insertion pillar 15, which is received in the receiving hole 11 and the locating hole 5 of the insertion plate 3. The upper segment 6 and the lower segment 2 are located end to end in a straight line. As the press rod 13 is pressed to cause the insertion pillar 15 of the retaining member 14 to move away from the locating hole 5, the upper segment 6 and the lower segment 2 can be bent and located such that the insertion pillar 15 is located in another locating hole 5.

Such a rod bending mechanism of the prior art as described above is defective in design in that the pressing of the press rod 13 must be done with a force greater than the spring force of the spring 12, and that the mechanism may be triggered accidentally by the press rod 13 which is inadvertently pressed. In addition, the motion of pressing the press rod 13 in a repeated manner can cause discomfort to the hand of a user of the rod.

SUMMARY OF THE INVENTION

The primary objective of the present invention is to provide a rod bending mechanism which is free of the drawbacks of the prior art rod bending mechanism described above.

The rod bending mechanism of the present invention comprises a pivoting plate, a pivoting seat, and at least one locating member. The pivoting plate is extended from one end of a first segment of a rod and is provided with a first pivoting hole, a first locating hole, and a second locating hole. The pivoting seat comprises two side plates extending from one end of a second segment of the rod. The pivoting plate is disposed between the two side plates, which are provided with a through hole and a second pivoting hole. The pivoting plate is pivoted with the pivoting seat by a first spindle which is received in the first pivoting hole and the second pivoting hole. The locating member is disposed on one of the side plates and is composed of a press button pivoted with the side plate, an insertion pin pivoted with one end of the press button such that the insertion pin is put through the through hole and the first locating hole, and an elastic member urging the side plate and other end of the press button.

DETAILED DESCRIPTION OF THE INVENTION

Figure 1:
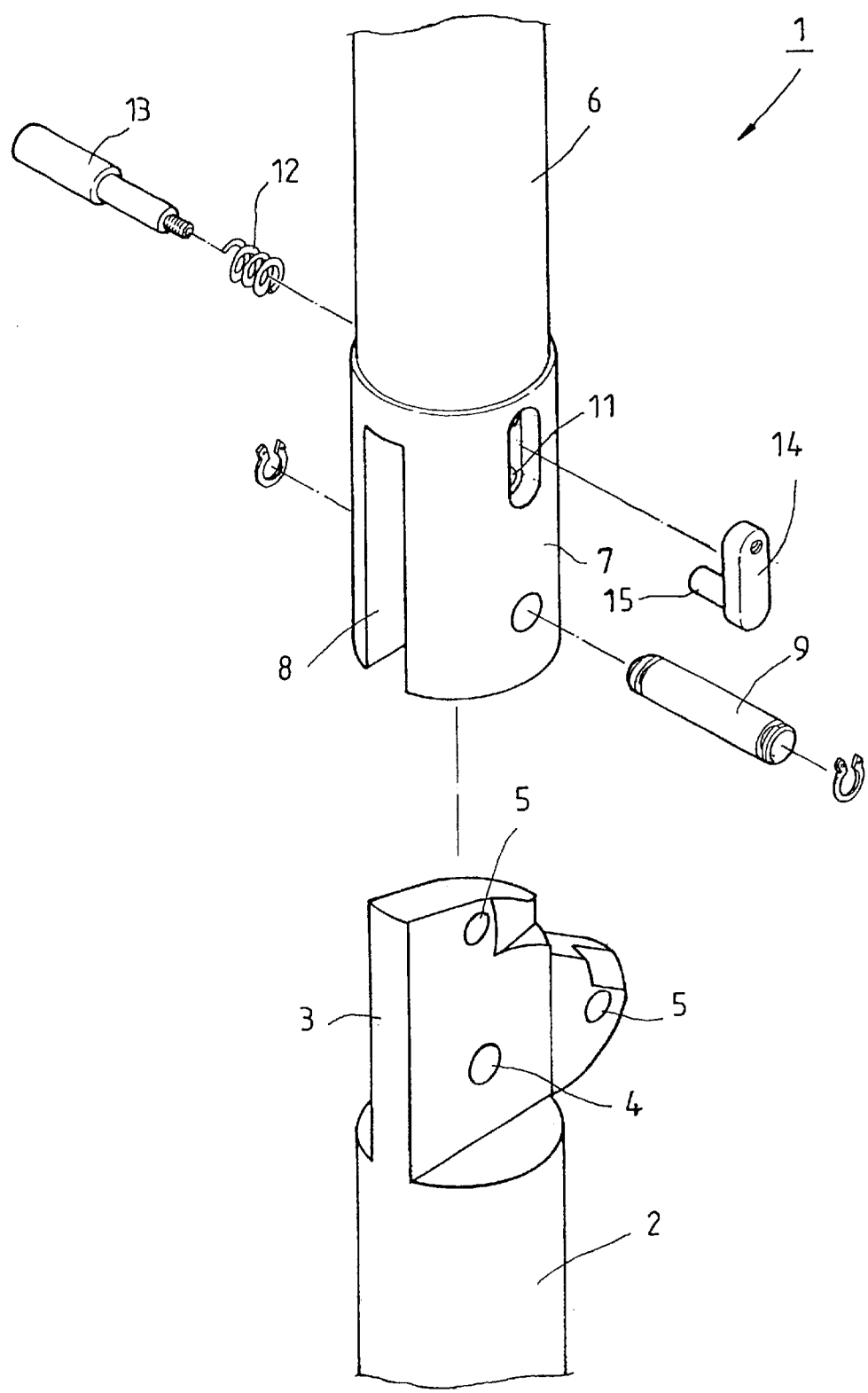
FIG. 1 shows an exploded view of a rod bending mechanism of the prior art.
Figure 2:
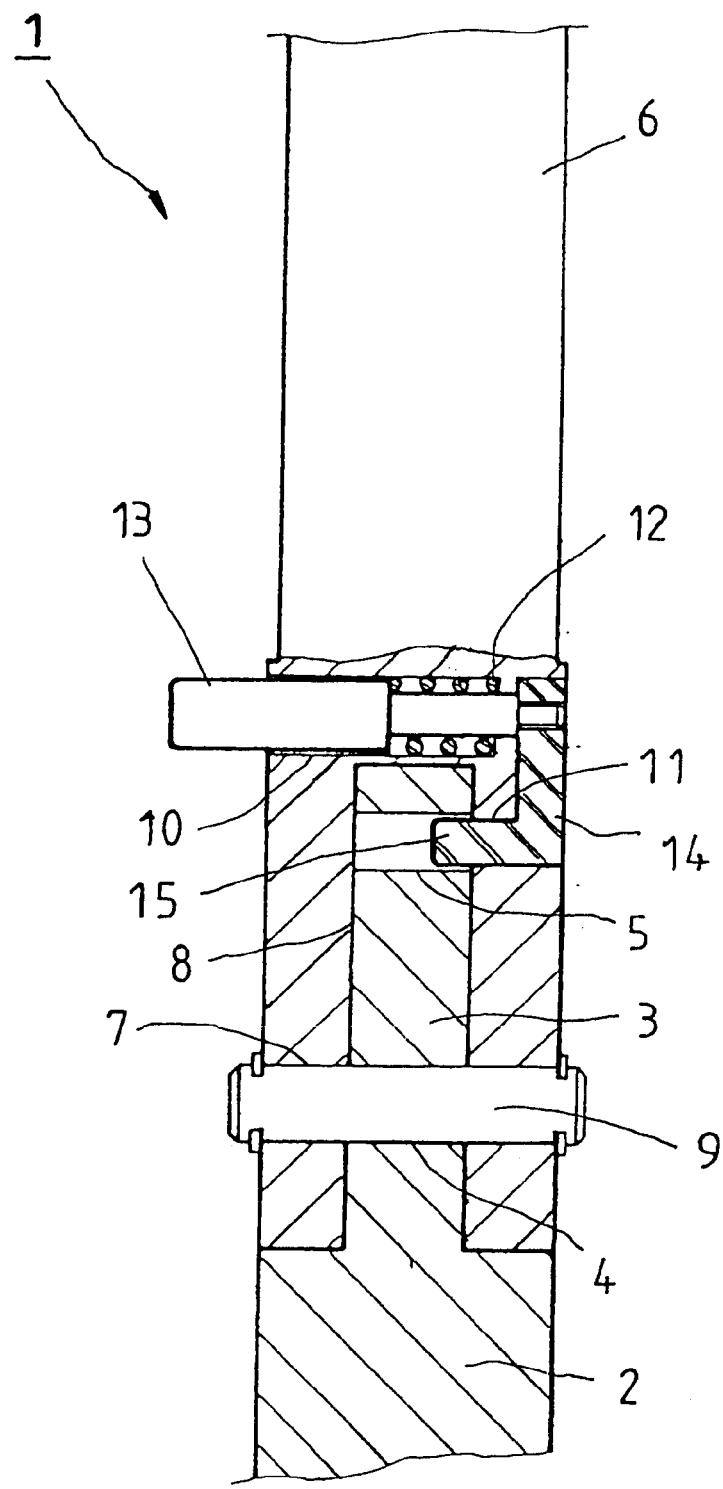
FIG. 2 shows a longitudinal sectional view of the rod bending mechanism of the prior art in combination.
Figure 3:
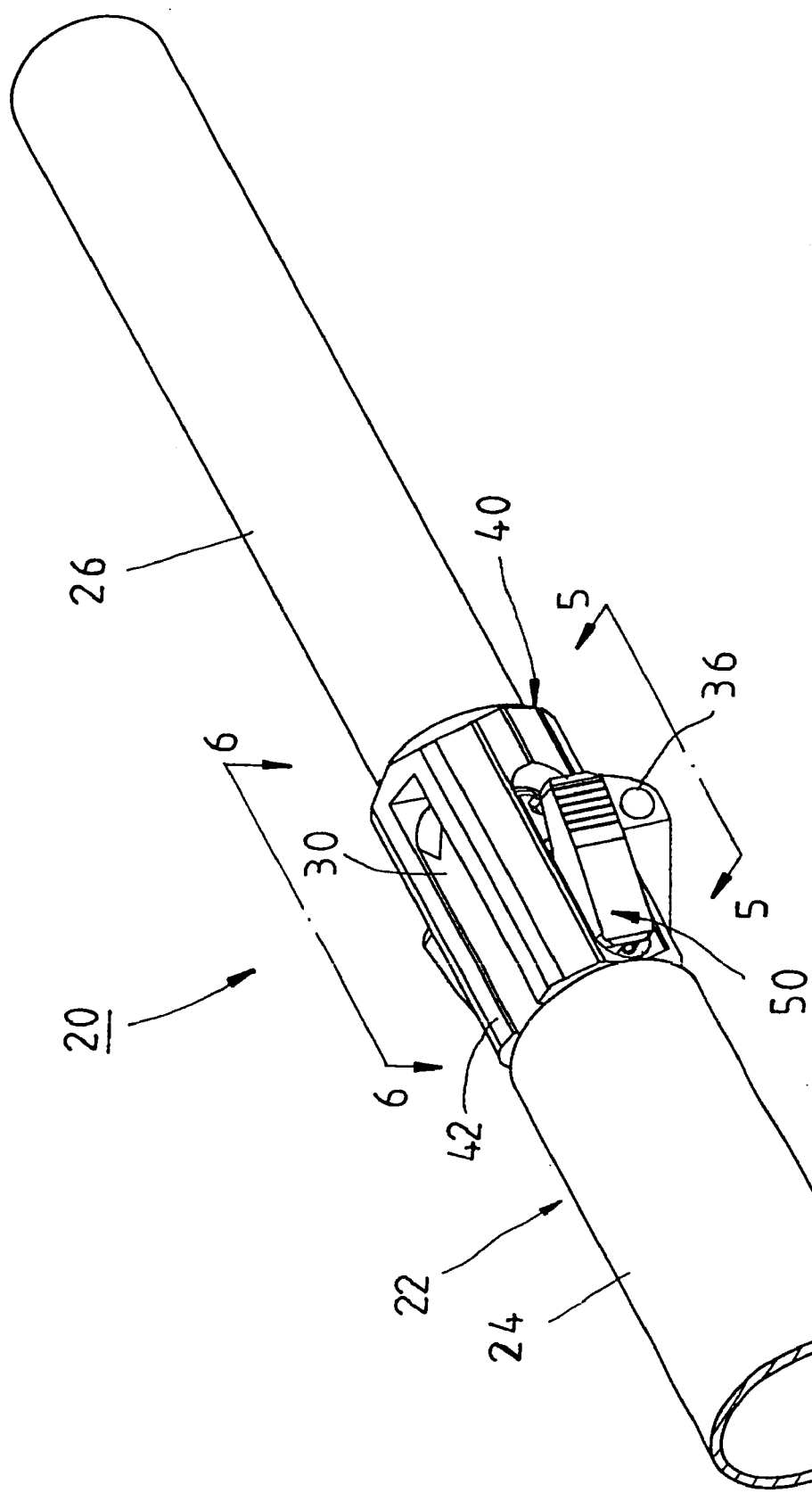
FIG. 3 shows a perspective view of a first preferred embodiment of the present invention.
Figure 4:
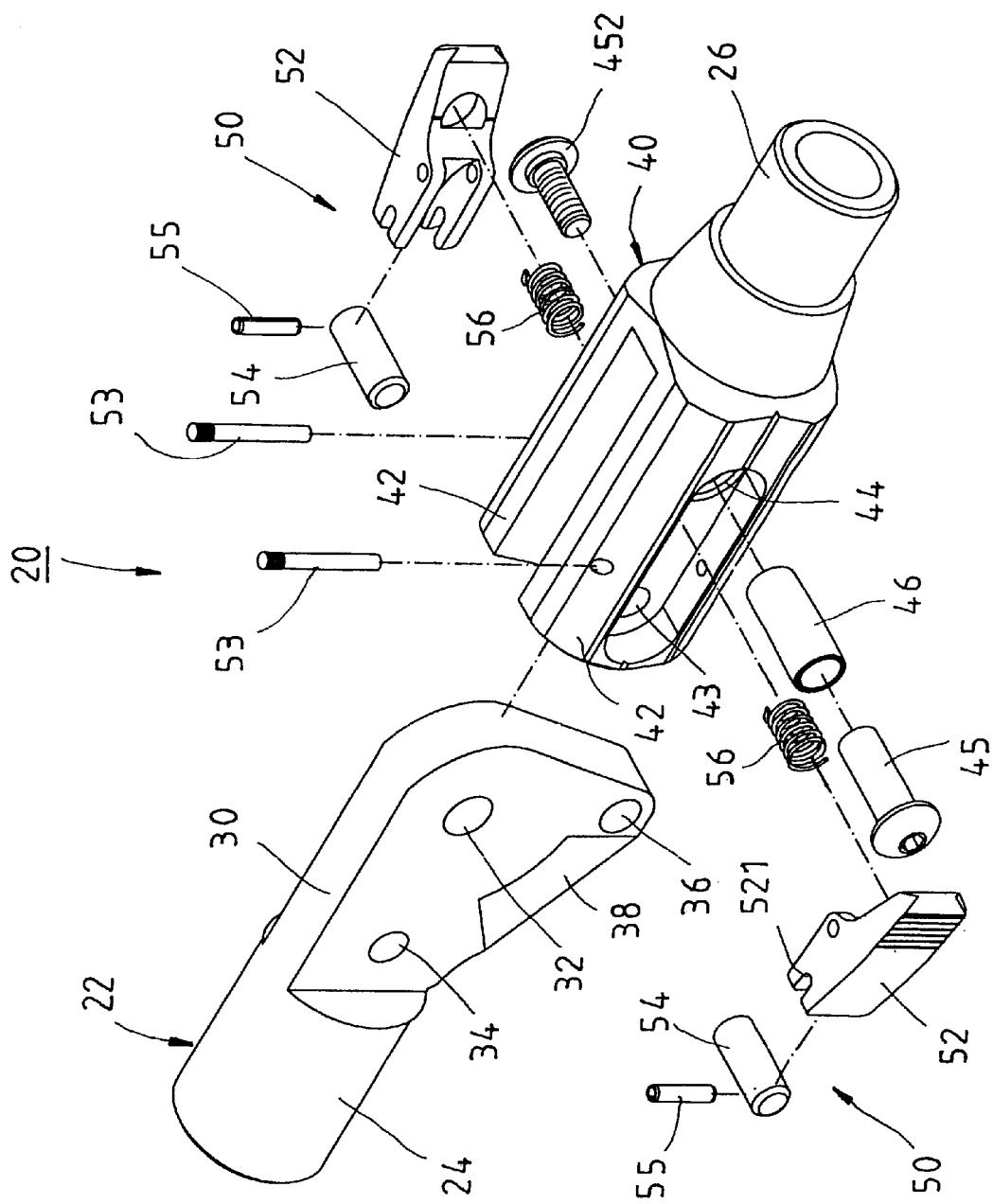
FIG. 4 shows an exploded view of the first preferred embodiment of the present invention.
Figure 5:
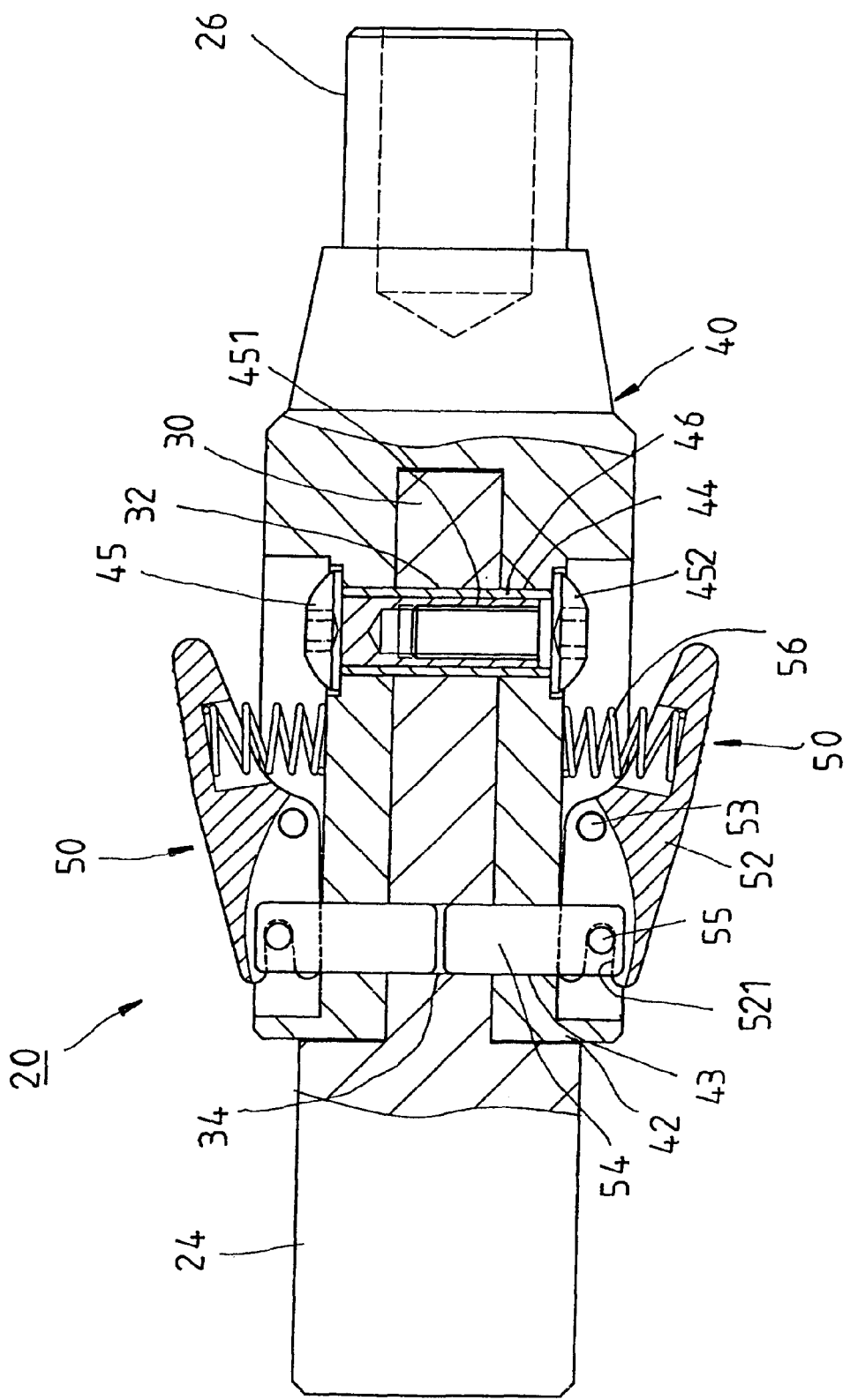
FIG. 5 shows a sectional view taken along the direction indicated by a line 5—5 as shown in FIG. 3.
Figure 6:
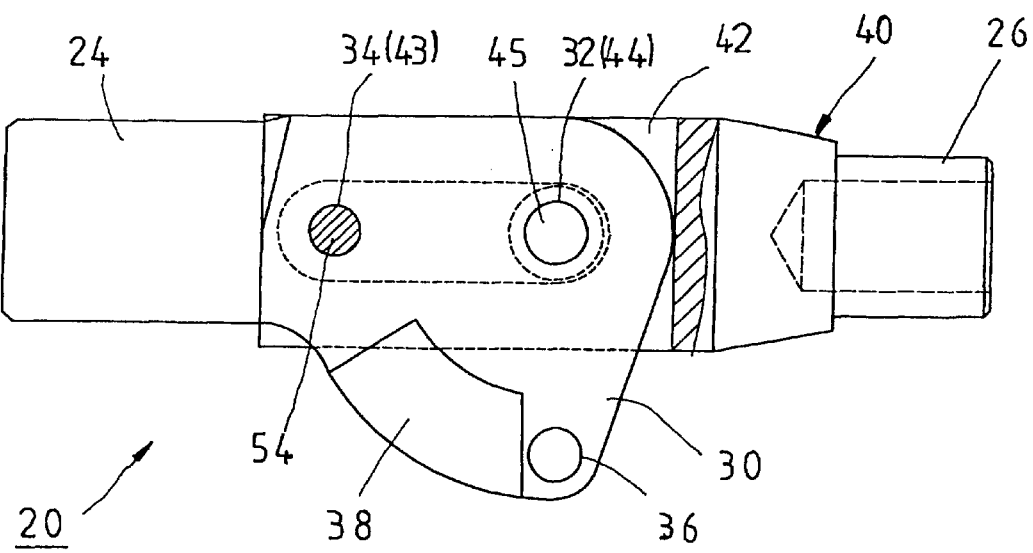
FIG. 6 shows a sectional view taken along the direction indicated by a line 6—6 as shown in FIG. 3.

As shown in FIGS. 3–6, a rod bending mechanism 20 embodied in the present invention is disposed between a first segment 24 of a rod 22 and a second segment 26 of the rod 22. The rod bending mechanism 20 comprises a pivoting plate 30, a pivoting seat 40, and two locating members 50.

The pivoting plate 30 is of a trapezoidal construction and is extended from one end of the first segment 24. The pivoting plate 30 is provided with a first pivoting hole 32, a first locating hole 34, and a second locating hole 36. The first locating hole 34 and the second locating hole 36 are equidistantly separated from the first pivoting hole 32. The pivoting plate 30 is provided in two sides with a guide portion 38 of a recessed construction. The guide portion 38 is located between the first locating hole 34 and the second locating hole 36.

The pivoting seat 40 comprises two parallel side plates 42 extending from one end of the second segment 26 for disposing the pivoting plate 30 therebetween. The two side plates 42 are provided with a through hole 43, and a second pivoting hole 44. The pivoting plate 30 is pivoted with the pivoting seat 40 by a first spindle 45 which is put through the first pivoting hole 32 and the second pivoting hole 44. The first spindle 45 is provided with a sleeve 46 fitted thereover for reducing friction. The first spindle 45 is provided with an inner threaded portion 451, which is engaged with a bolt 452 for locating the first spindle 45 in place.

The two locating members 50 are disposed respectively on the side plates 42 and are composed of a press button 52 pivoted to the side plate 42 by a second spindle 53, an insertion pin 54 pivoted with one end of the press button 52 by a third spindle 55 such that the insertion pin 54 is put through the through hole 43 and the first locating hole 34, and an elastic member 56 which is a spring urging at one end thereof the side plate 42 and at other end thereof other end of the press button 52. The press button 52 is provided at one end with a slot 521 having a predetermined depth. The third spindle 55 is slidably disposed in the slot 521. The insertion pin 54 moves only along the hole center direction of the through hole 43. When the press button 52 is turned, the third spindle 55 slides back and forth in the slot 521. In view of the production cost, the present invention may comprises only one locating member 50.

Figure 7:
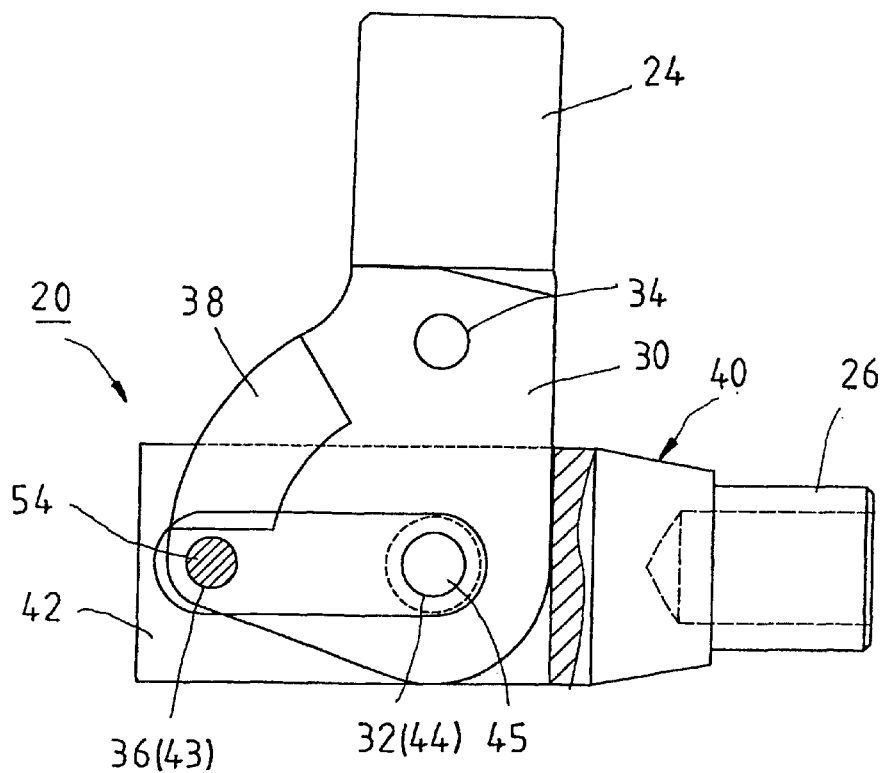
FIG. 7 shows a schematic view of the first preferred embodiment of the present invention at work.

The rod 22 is bent by pressing the press button 52 to cause the insertion pin 54 to move away from the first locating hole 34 of the pivoting plate 30, thereby resulting in the bending of the first segment 24 and the second segment 26. In the meantime, the press button 52 is relieved of the pressure exerting thereon, the press button 52 is forced by the recovery force of the spring 56 to return to its original position such that the free end of the insertion pin 54 urges the guide portion 38 of the pivoting plate 30. In light of the guide portion 38 being arcuately recessed, the deformity of the spring 56 is greatly reduced at the time when the insertion pin 54 urges the guide portion 38. In the meantime, the positive direction force and the friction exerting on the pivoting plate 30 by the insertion pin 54 are reduced. For this reason, the guide portion 38 is capable of effective reduction in friction at such time when the first segment 24 and the second segment 26 are turned in relation to each other. The first segment 24 and the second segment 26 are located as soon as the insertion pin 54 is forced by the spring force of the spring 56 into the second locating hole 36, as shown in FIG. 7.

Figure 8:
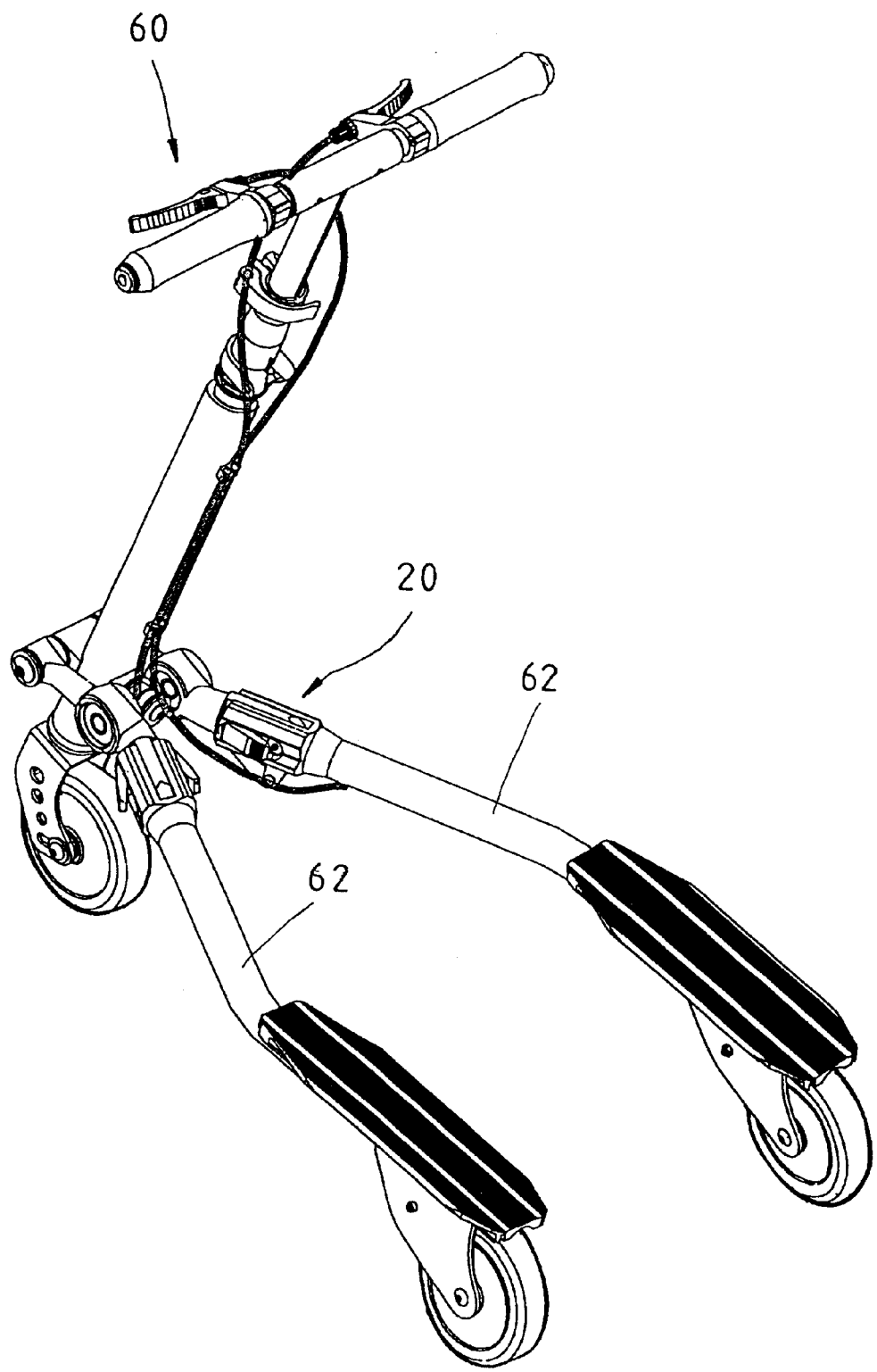
FIG. 8 shows a schematic view of the first preferred embodiment of the present invention in conjunction with a tricycle.
Figure 9:
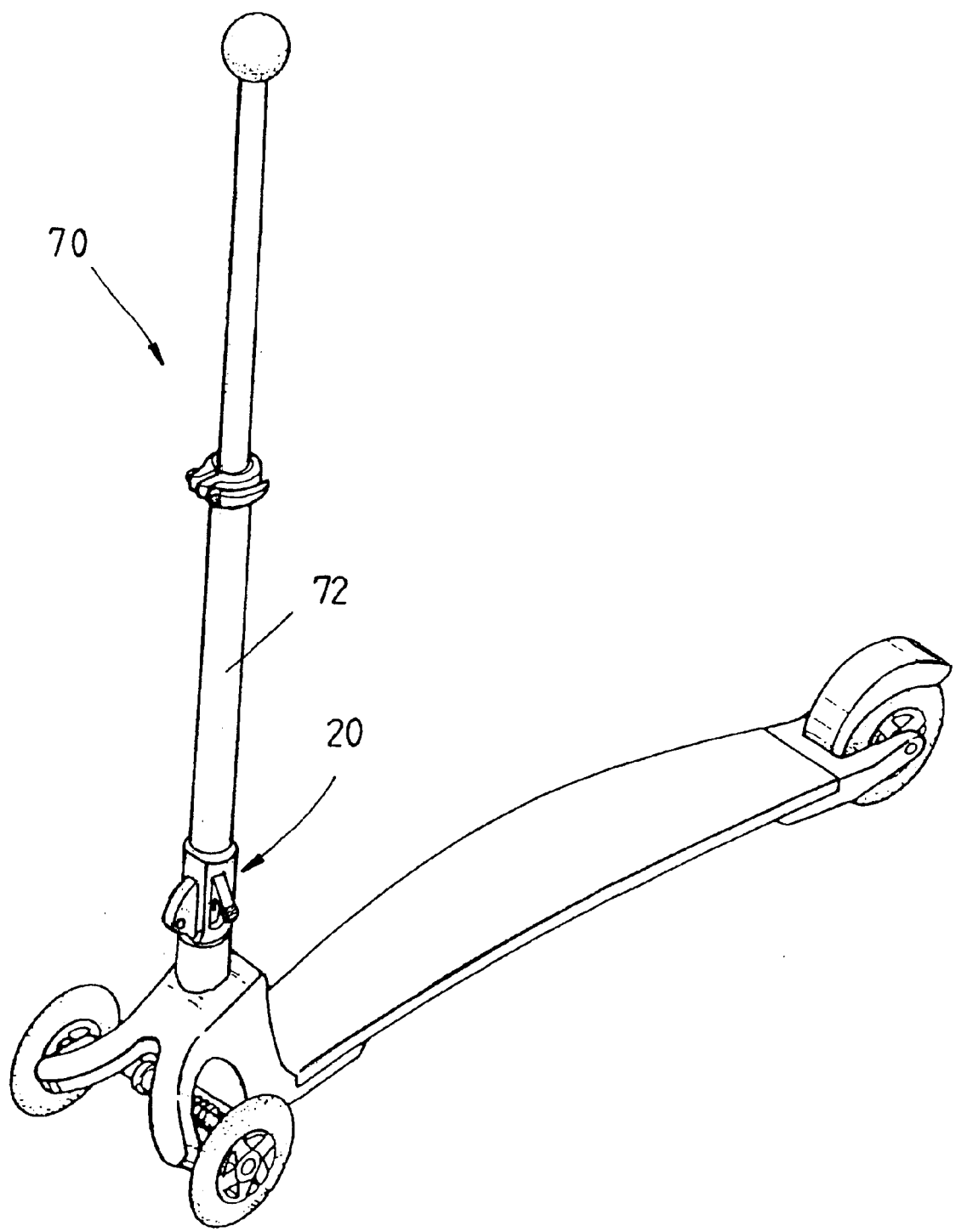
FIG. 9 shows a schematic view of the first preferred embodiment of the present invention in conjunction with a scooter.

The rod bending mechanism 20 of the present invention is applicable to two bottom tubes 62 of a tricycle 60, as shown in FIG. 8, and to the foldable handlebar frame 72 of a scooter 70, as shown in FIG. 9.

Figure 10:
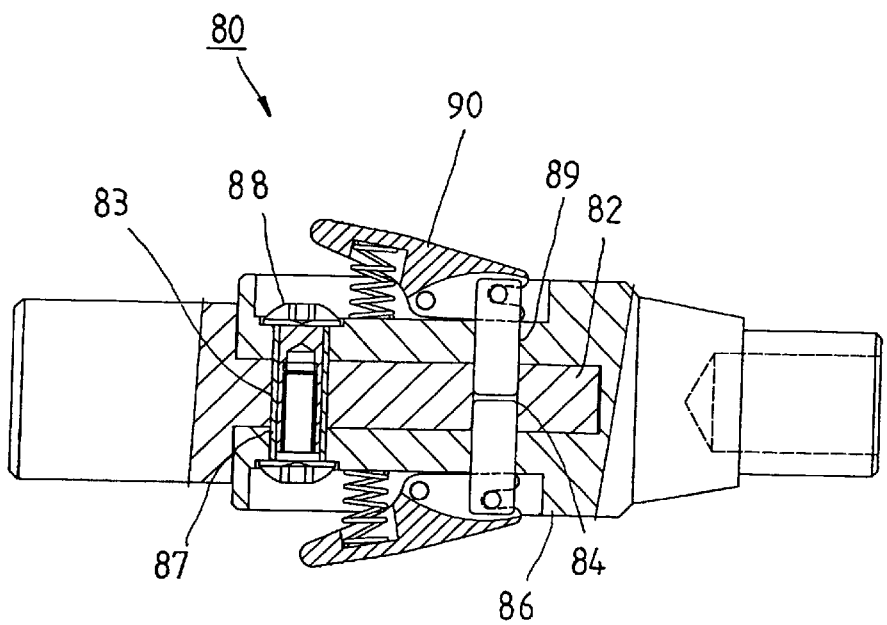
FIG. 10 shows a sectional view of a second preferred embodiment of the present invention.
Figure 11:
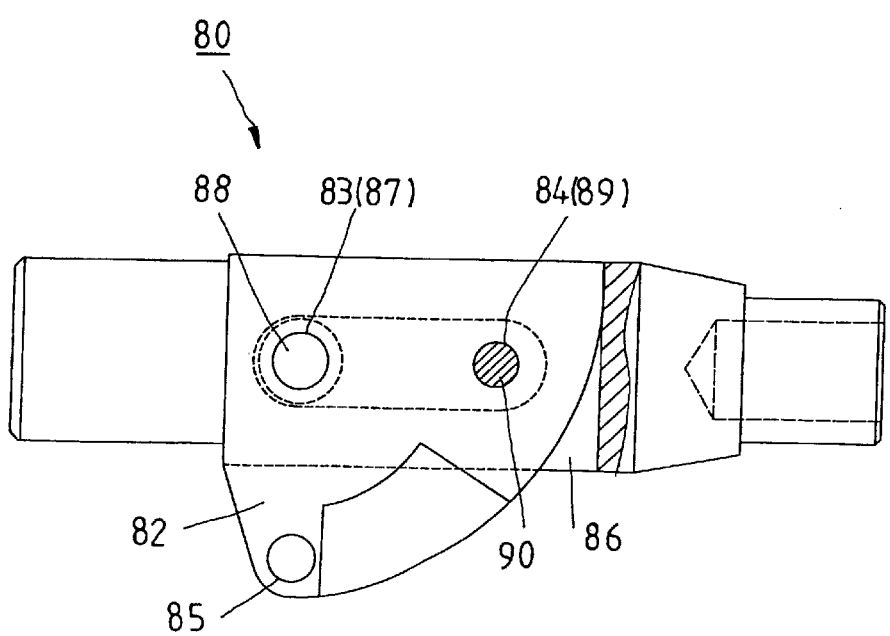
FIG. 11 shows another sectional view of the second preferred embodiment of the present invention.

As shown in FIGS. 10 and 11, a rod bending mechanism 80 of the second preferred embodiment of the present invention is basically similar in construction to the mechanism 20 described above, except that the mechanism 80 comprises a pivoting plate 82 with a first pivoting hole 83, a first locating hole 84, and a second locating hole 85, which are different in location from the counterparts of the mechanism 20. As a result, the second pivoting hole 87 and the first spindle 88 are different in location. The through hole 89 and the locating member 90 are also changed in terms of position.

What is claimed is:

1. A rod bending mechanism disposed between a first segment and a second segment of the rod, said mechanism comprising:

a pivoting plate extending from one end of the first segment and having a first pivoting hole, a first locating hole, and a second locating hole, said first locating hole and said second locating hole being equidistantly separated from said first pivoting hole;

a pivoting seat comprising two side plates extending from one end of the second segment such that said two side plates are separated from each other by a predetermined distance for receiving therebetween said pivoting plate, said two side plates being provided with a through hole and a second pivoting hole whereby said pivoting plate is pivoted with said pivoting seat by a first spindle which is put through said first pivoting hole and said second pivoting hole; and at least one locating member disposed on one of said side plates of said pivoting seat and formed of a press button, an insertion pin, and an elastic element, said press button being pivoted to said one side plate, said insertion pin being pivoted to one end of said press button such that said insertion pin is received in said through hole and said first locating hole, said elastic element urging at one end thereof said one side plate, and at other end thereof other end of said press button.

2. The rod bending mechanism as defined in claim 1, wherein said pivoting plate is provided with a guide portion whereby said guide portion is of a recessed construction and is located between said first locating hole and said second locating hole.

3. The rod bending mechanism as defined in claim 1, wherein said pivoting plate is provided in two sides thereof with a guide portion whereby said guide portion is of a recessed construction and is located between said first locating hole and said second locating hole.

4. The rod bending mechanism as defined in claim 1, wherein said press button is provided at one end with a slot having a predetermined depth; wherein said insertion pin is pivoted with said press button by a third spindle whereby said third spindle is slidably disposed in said slot of said press button.

5. The rod bending mechanism as defined in claim 1 comprising two locating members which are respectively disposed on said two side plates of said pivoting seat.

6. The rod bending mechanism as defined in claim 1, wherein said elastic element is a spring.

* * * * *